US009064257B2

(12) United States Patent
Beigi

(10) Patent No.: US 9,064,257 B2
(45) Date of Patent: Jun. 23, 2015

(54) MOBILE DEVICE TRANSACTION USING MULTI-FACTOR AUTHENTICATION

(76) Inventor: Homayoon Beigi, Yorktown Heights, NY (US)

( * ) Notice: Subject to any disclaimer, the term of this patent is extended or adjusted under 35 U.S.C. 154(b) by 878 days.

(21) Appl. No.: 13/287,994

(22) Filed: Nov. 2, 2011

(65) Prior Publication Data
US 2012/0110341 A1 May 3, 2012

Related U.S. Application Data

(60) Provisional application No. 61/409,151, filed on Nov. 2, 2010.

(51) Int. Cl.
| G06F 21/00 | (2013.01) |
| G06Q 20/40 | (2012.01) |
| G06Q 20/32 | (2012.01) |
| G06Q 20/38 | (2012.01) |

(52) U.S. Cl.
CPC .......... *G06Q 20/409* (2013.01); *G06Q 20/3223* (2013.01); *G06Q 20/3827* (2013.01)

(58) Field of Classification Search
CPC combination set(s) only.
See application file for complete search history.

(56) References Cited

U.S. PATENT DOCUMENTS

| 6,553,494 | B1 * | 4/2003 | Glass ........................... 713/186 |
| 7,200,749 | B2 * | 4/2007 | Wheeler et al. ............... 713/170 |
| 7,474,770 | B2 | 1/2009 | Beigi |
| 7,522,751 | B2 * | 4/2009 | White et al. .................. 382/115 |
| 7,702,918 | B2 * | 4/2010 | Tattan et al. .................. 713/186 |
| 7,711,152 | B1 * | 5/2010 | Davida et al. ................. 382/115 |
| 8,384,515 | B2 * | 2/2013 | Rachlin ........................ 340/5.82 |
| 8,595,804 | B2 * | 11/2013 | Pratt et al. .......................... 726/5 |
| 2001/0000535 | A1 * | 4/2001 | Lapsley et al. .................. 705/64 |
| 2002/0095587 | A1 * | 7/2002 | Doyle et al. .................. 713/186 |
| 2004/0139332 | A1 * | 7/2004 | Lim ............................... 713/185 |
| 2004/0151353 | A1 * | 8/2004 | Topping ....................... 382/124 |

FOREIGN PATENT DOCUMENTS

| WO | WO98/34203 | 8/1998 |
| WO | WO0031699 | 6/2000 |
| WO | WO02/41271 | 5/2002 |

OTHER PUBLICATIONS

"A k-nearest Neighbor Approach for User Authentication Through Biometric Keystroke Dynamics," Hu et al., Communications, 2008, ICC '08 IEEE International Conference, pp. 1556-1560.
"A New Approach for Hand-Palm Recognition", Saeed et al., Enhanced Methods in Computer Security, Biometric and Artificial Intelligence Systems, Lecture Notes in Computer Science, pp. 185-194, Springer London ISBN: 1-4020-7776-9.

(Continued)

*Primary Examiner* — Eleni Shiferaw
*Assistant Examiner* — Phy Anh Vu
(74) *Attorney, Agent, or Firm* — Gordon & Jacobson, PC

(57) ABSTRACT

The following is a system in which a person may use a Cellular (Mobile) Telephone, a PDA or any other handheld computer to make a purchase. This is an example only. The process may entail any type of transaction which requires authentication, such as any financial transaction, any access control (to account information, etc.), and any physical access scenario such as doubling for a passport or an access key to a restricted area (office, vault, etc.). It may also be used to conduct remote transactions such as those conducted on the Internet (E-Commerce, account access, etc.). In the process, a multi-factor authentication is used.

30 Claims, 14 Drawing Sheets

Registration with the Transaction Authority

(56) References Cited

OTHER PUBLICATIONS

"A Novel Approach for Ear Recognition Based on ICA and RBF Network", Zhang et al., 2005, Machine Learning and Cybernetics, Proceedings of 2005 International Conference, vol. 7, pp. 4511-4515.
"Access Control System with Hand Geometry Verification and Smart Cards" Sanchez-Reillo et al., IEEE AES Systems Magazine, Feb. 2000.
"Acoustic Ear Recognition for Person Identification," Akkermans et al., Automatic Identification Advanced Technologies, 2005, Fourth IEEE Workshop, pp. 219-223.
"An Approach to Feature Selection for Keystroke Dynamics Systems Based on Pso and Feature Weighting," Azevedo et al, Evolutionary Computation, CEC 2007, IEEE Congress, pp. 3577-3584.
"An Introduction to Near-Field Communication and the Contactless Communication API," C. Enrique Ortiz, sun, Jun. 2008, available at http://java.sun.com/developer/technicalArticles/javame/nfc/.
"Appearance-Based Facial Recognition Using Visible and Thermal Imagery: A Comparative Study", Selinger et al., 2003.
"Computer-Access Security Systems Using Keystroke Dynamics," Bleha et al., IEEE Transactions on Pattern Analysis and Machine Intelligence, vol. 12, No. 12, pp. 1217-1222, Dec. 1990.
"Ear Recognition by Means of a Rotation Invariant Descriptor," Fabate et al., Pattern Recognition, 2006, ICPR 2006, 18th International Conference, vol. 4, pp. 437-440.
"Evaluating the Reliability of Credential Hardening Through Keystroke Dynamics," Bartlow and Cukik, Software Reliability Engineering, 2006, ISSRE '06. 17th International Symposium, pp. 117-126.
"Face Recognition: Features Versus Templates," Brunelli and Poggio, IEEE Transactions on Pattern Analysis and Machine Intelligence, vol. 15, No. 10, pp. 1042-1052, Oct. 1993.
"Human Ear Recognition in 3d," Chen and Bhanu, IEEE Transactions on Pattern Analysis and Machine Intelligence, vol. 29, No. 4, pp. 718-737, Apr. 2007.
"Human Identification Based on 3d Ear Models," Cadavid and Abdel-Mottaleb, Biometrics: Theory, Applications, and Systems, 2007. BTAS 2007, First IEEE International Conference, pp. 1-6.
Internet X.509 Public Key Infrastructure Certificate and Certificate Revocation List (CRL) Profile, RFC 5280 (Proposed Standard,) Cooper et al., 2008.
"Multimodal Recognition Based on Face and Ear", Yuan et al., Wavelet Analysis and Pattern Recognition, 2007 ICWAPR '07, International Conference, vol. 3, pp. 1203-1207.
"Multi-View Ear Shape Feature Extraction and Reconstruction," Liu and Yan, Signal-Image Technologies and Internet-Based System, 2007, SITIS '07 Third International IEEE Conference, pp. 652-658.
"Personal Identification Based on Iris Texture Analysis" Ma et al., IEEE Transactions on Pattern Analysis and Machine Intelligence, vol. 25, No. 12, pp. 1519-1533, Dec. 2003.
Practice Note: Examples of Financial Services Using Mobile Phones, World Wide Web http://www.ictregulationtoolkit.org/en/PracticeNote.3096.html.
"Rapid Heterogeneous Connection Establishment: Accelerating Bluetooth Inquiry Using IrDA", Ryan Woodings et al., Proc. of the Third Annual IEEE Wireless Communications and Networking Conference (WCNC) 2002, vol. 1, Orlando, Florida, Mar. 2002, pp. 342-349.
"The Transformational Potential of M-Transactions", Vodaphone Group PLc, 2007.
"User Authentication Through Typing Biometrics Features," Araujo et al., IEEE Transactions on Signal Processing, vol. 53, No. 2, pp. 851-855, Feb. 2005.
"Using 2d Wavelet and Principal Component Analysis for Personal identification Based on 2d Ear Structure," Nosrati et al. 2007, Intelligent and Advanced Systems, ICIAS 2007, International Conference, pp. 616-620.
"Visible-Spectrum Biometric Retina Recognition," Borgen et al., 2008, International Conference on Intelligent Information Hiding and Multimedia Signal Processing (IIHMSP2008) pp. 1056-1062.
Wizzit Has Done Its Homework, Says Mphahlele World Wid Web, Crotty, 2005, http://www.nextbillion.net/archive/files/Wizzit%20Business%20Report.pdf.

* cited by examiner

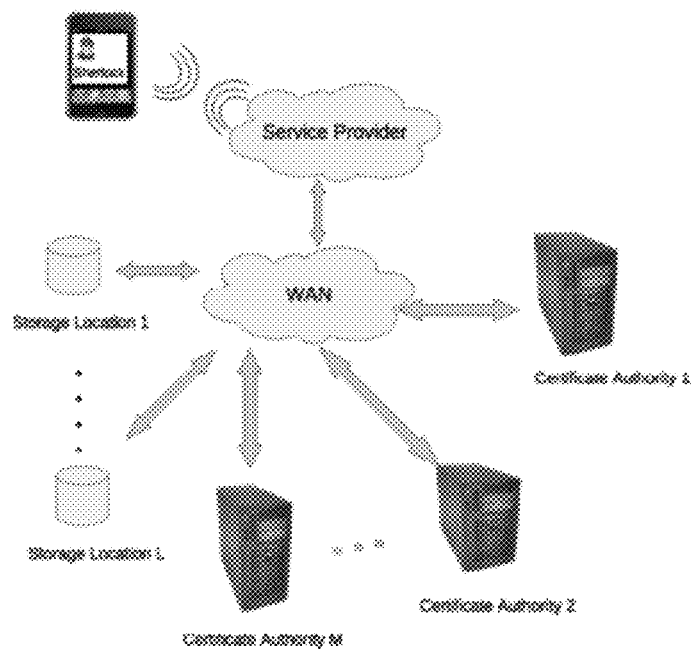
FIG. 1 Registration

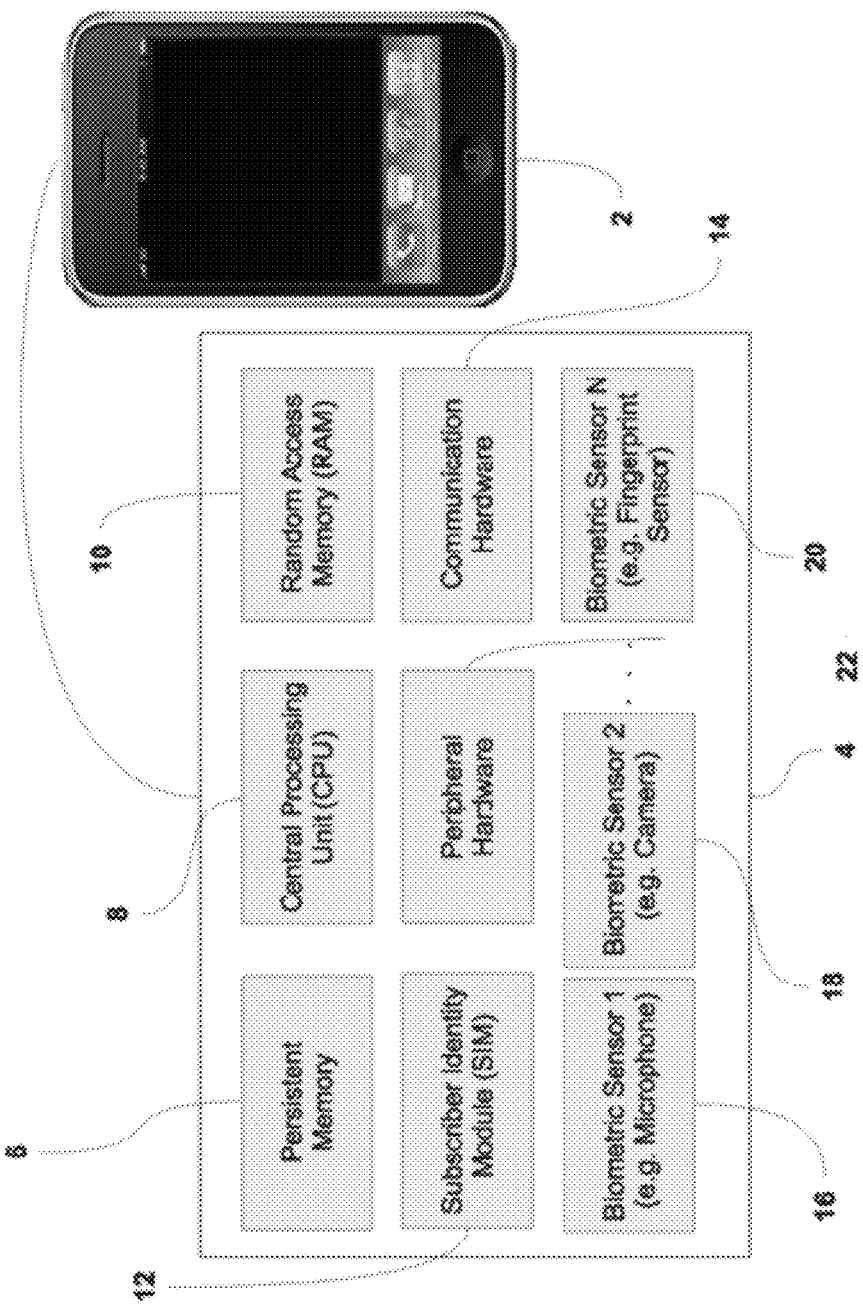
FIG. 2 PDA Components

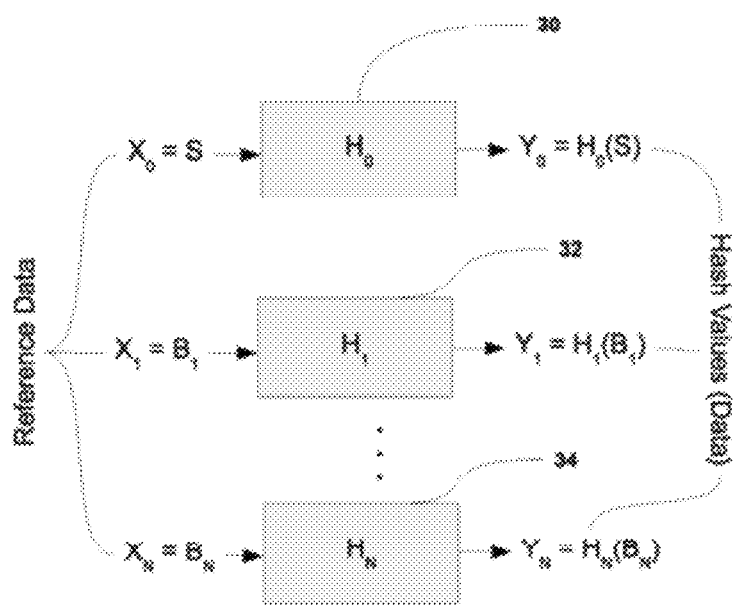
FIG. 3 Hash Function

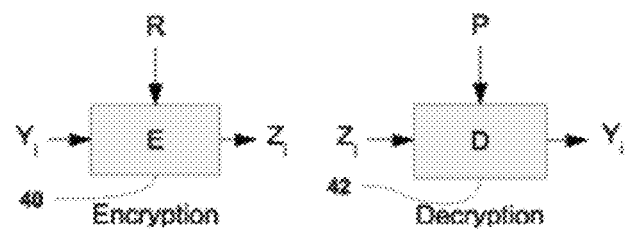
FIG. 4 Encryption and Decryption Functions

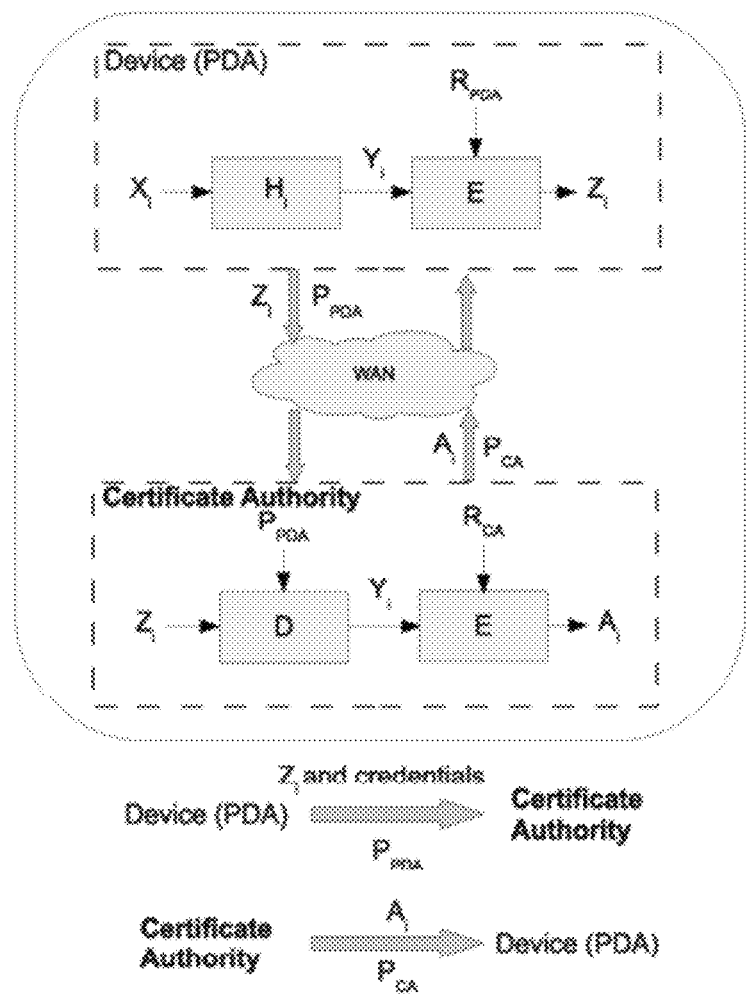
FIG. 5 Digital Signing

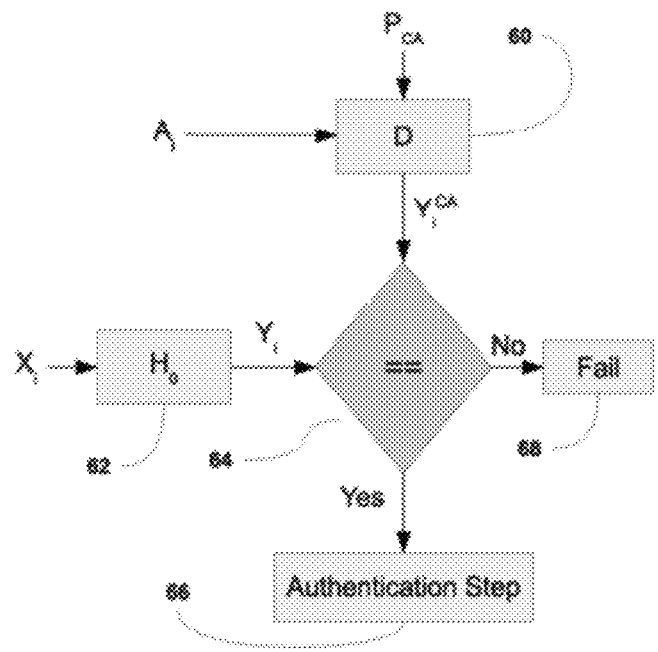
FIG. 6 Validation Process

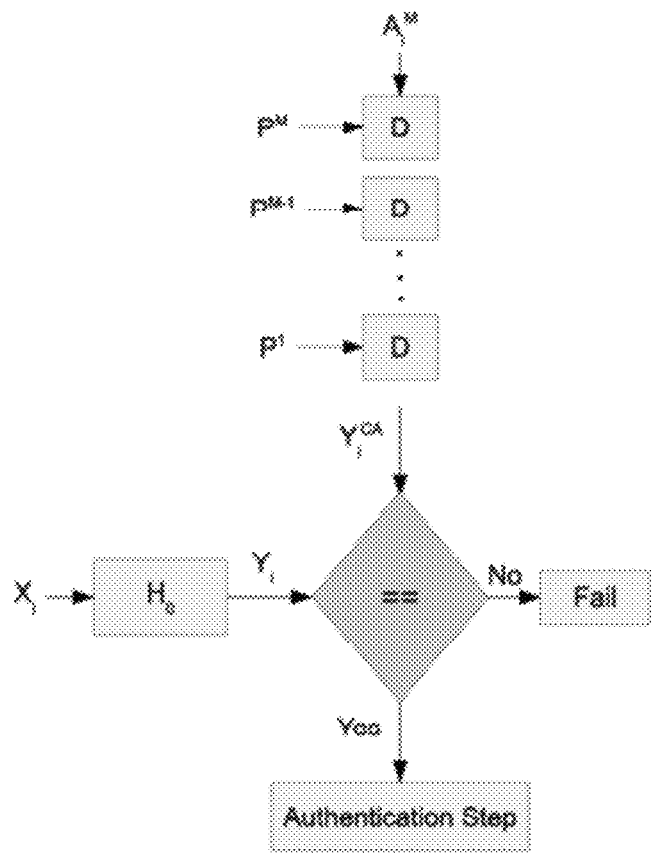
FIG. 7 Serial Validation Process

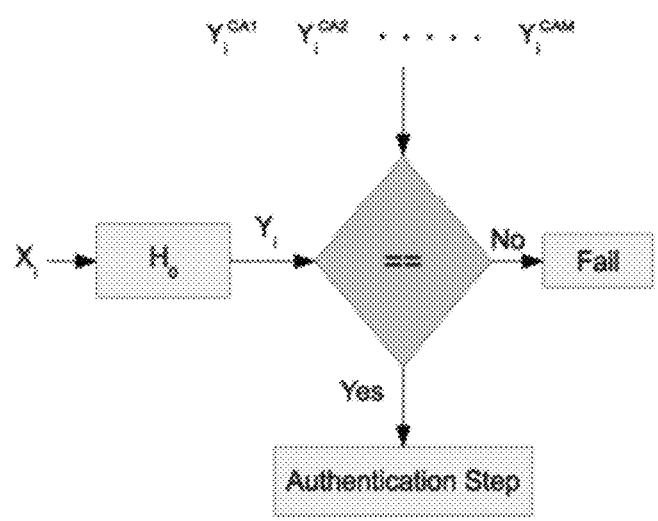
FIG. 8 Parallel Validation Process

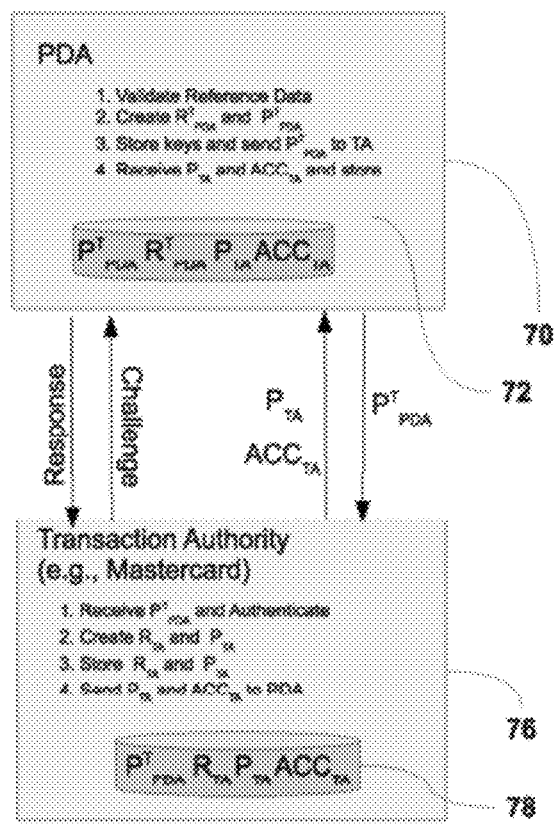
FIG. 9 Registration with the Transaction Authority

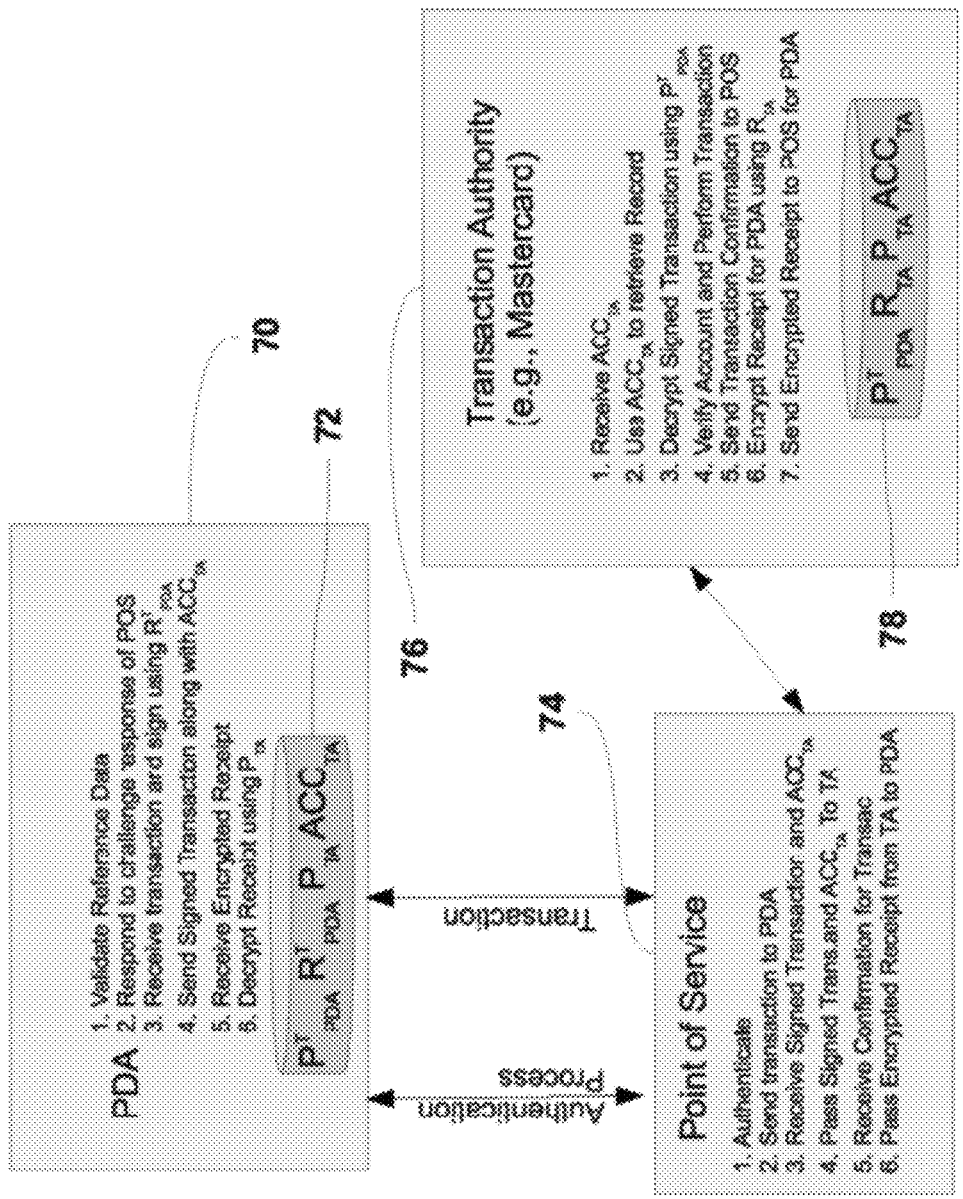
FIG. 10 Generic Transaction Process

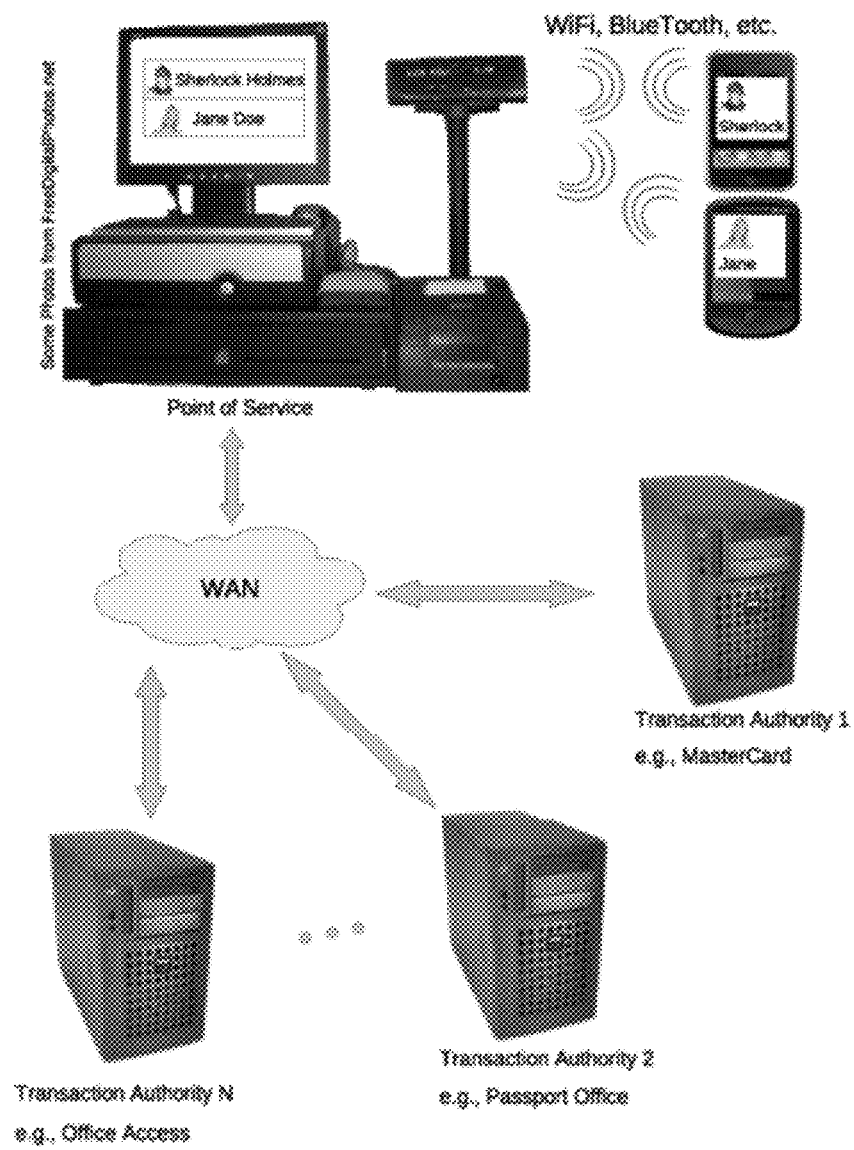
FIG. 11 POS Sales Transaction

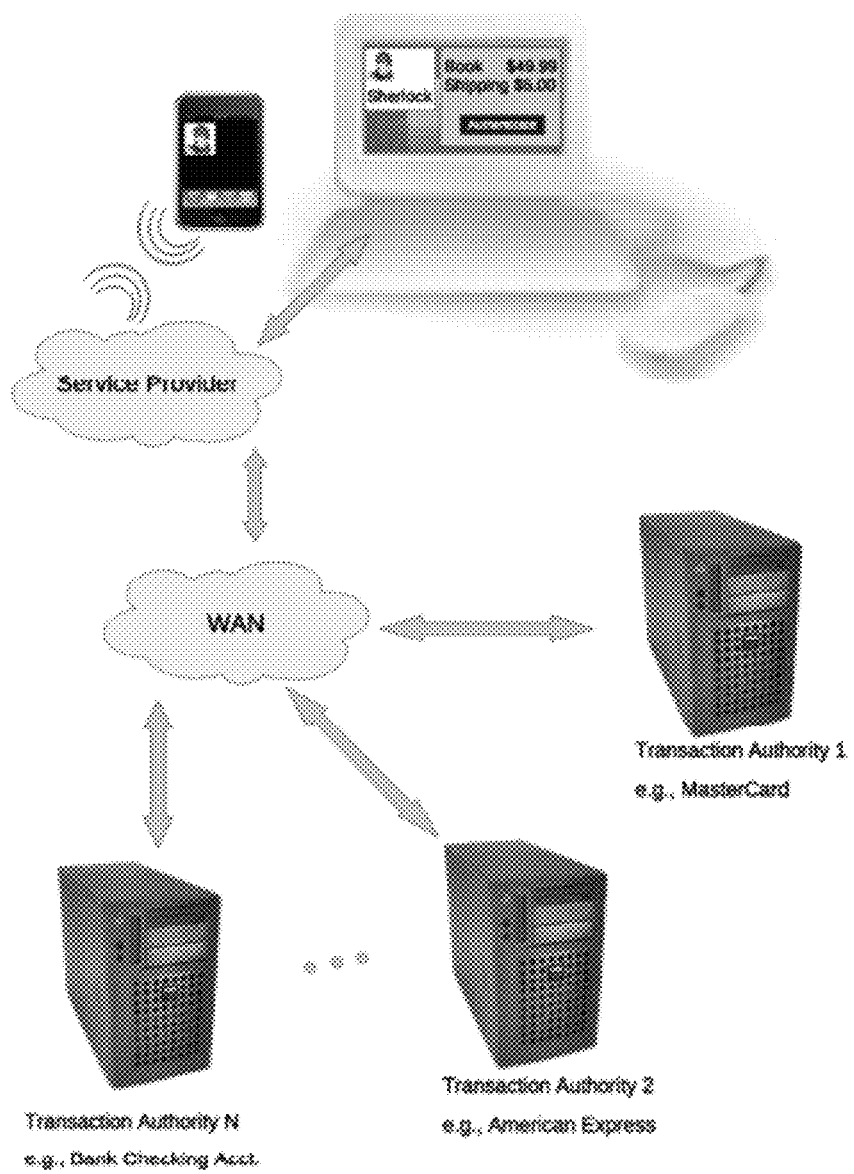
FIG. 12 Electronic Commerce Transaction

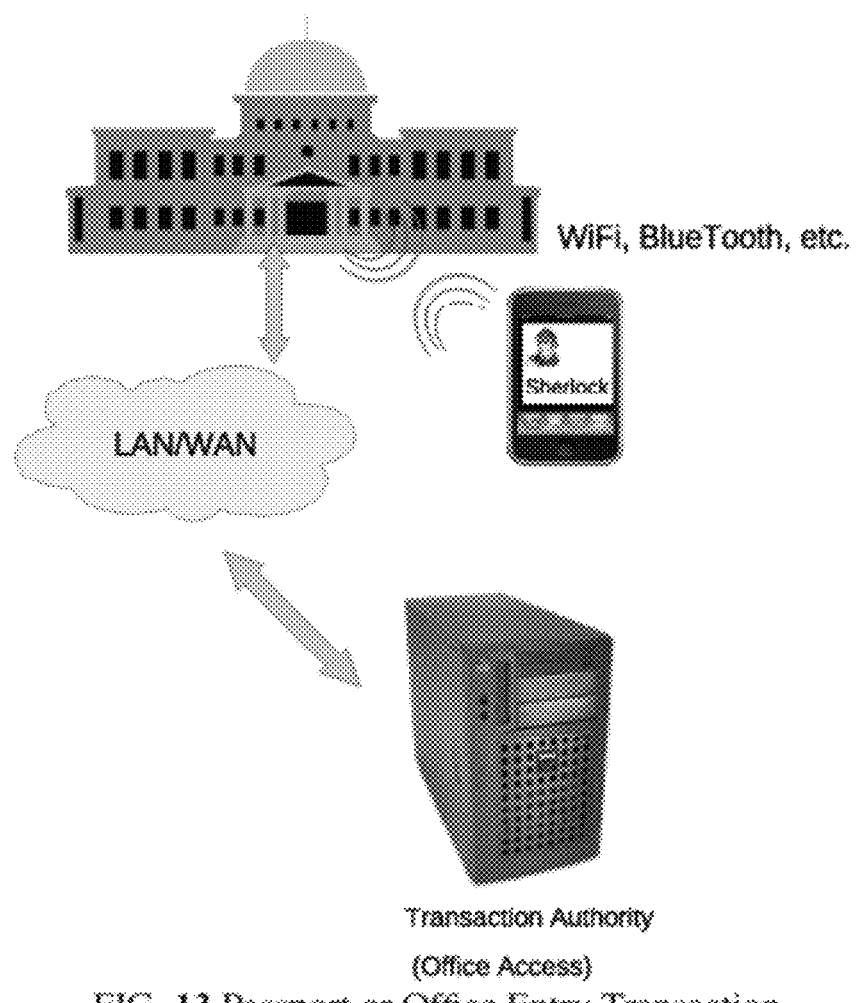
FIG. 13 Passport or Office Entry Transaction

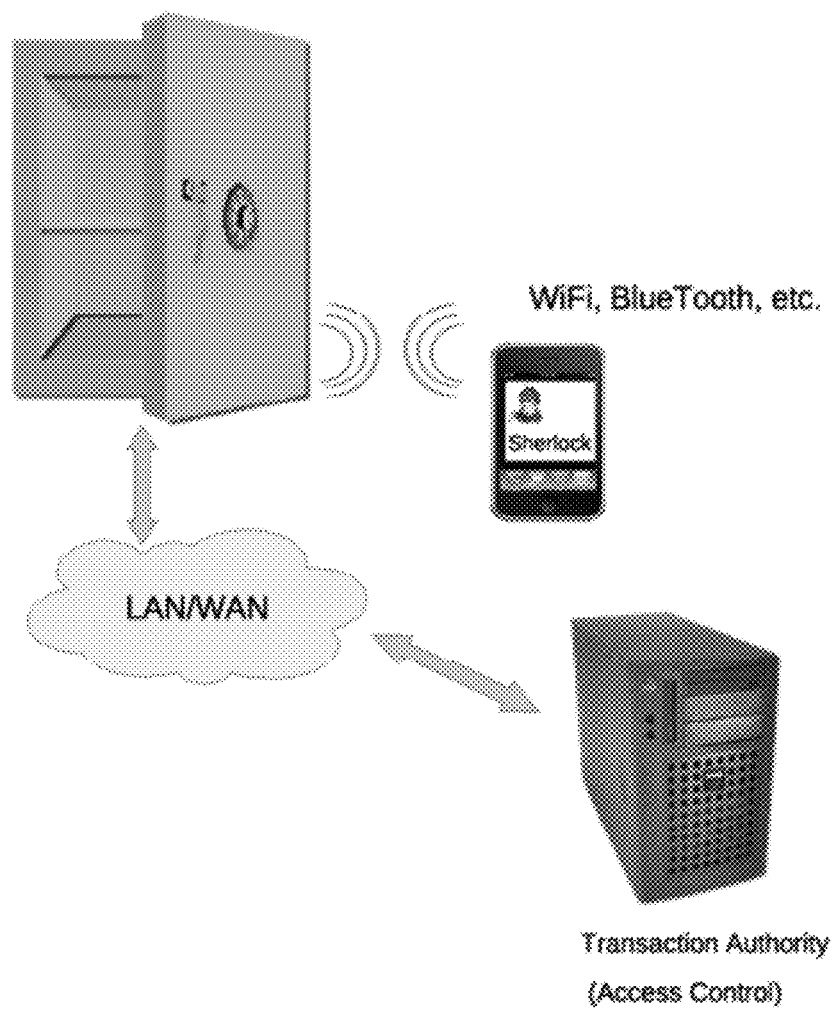
FIG. 14 Vault Access Transaction

MOBILE DEVICE TRANSACTION USING MULTI-FACTOR AUTHENTICATION

CROSS-REFERENCE TO RELATED APPLICATION(S)

The present application claims priority from U.S. Provisional Appl. No. 61/409,151, filed on Nov. 2, 2010, herein incorporated by reference in its entirety.

BACKGROUND OF THE INVENTION

1. Field of the Invention

This invention relates to the field of data security, authentication, as well as biometrics. It specifically relates to multi-factor authentication for conducting transactions, using a handheld device. It is also related to cryptography and key exchange encryption techniques such as symmetric and asymmetric hashing and encryption.

2. Description of the Related Art

Mobile devices such as smartphones, personal digital assistants (PDAs), as well as many other handheld devices are being used as authentication devices for financial as well as access transactions. In some countries these devices are providing the means for cash transactions in the same way a debit card is used. Some African countries have even been using these devices as prepaid credit devices which may be used for cash transactions simply by having the credit transferred from one phone to another. These are mostly done using the mobile network.

ICT Regulation Toolkit is a toolkit which is generated by the Information for Development Program (InfoDev) and the International Telecommunication Union (ITU). A Practice Note [ICT Regilation Toolkit, 2011] gives many different examples of financial services which are available through the use of a mobile phone. These include, Branchless Banking Models, such as the WIZZIT service [Crotty, 2005] in South Africa, Mobile Payment systems such as M-PESA in Kenya, Globe Telecom G-Cash service in the Philippines, and Airtime Transfers [Vodafone Group Plc., 2007] in Egypt, South Africa, and Kenya. See [ICT Regilation Toolkit, 2011] for details.

However, the listed transactions currently rely on one or two of the following two authentication factors:

1. Possession of an item (something one owns).
2. Knowledge of an fact (something one knows).

In the scenario of Paragraph 2, the phone is being used as an item being owned (1st authentication factor). In this case, if the phone is stolen or used without permission, one or more transactions may take place before the phone may be deactivated or the credit may be blocked. In fact, technically, the possession of the phone is equivalent to the old standard of possessing currency.

To reduce the chance of the fraud described in Paragraph 5, some implementations also require another factor in the form of something the person knows (2nd factor), such as a challenge passcode. However, most such passcodes are simple to ascertain and to abuse in order to attain unlawful access to the funds associated with the telephone.

SUMMARY OF THE INVENTION

The present invention provides for methods and systems that perform electronic transactions utilizing mobile devices in conjunction with multi-factor authentication. The multi-factor authentication utilizes three types of authentication factors including:

1. Possession of an item (something one owns).
2. Knowledge of an fact (something one knows).
3. Identity (something one is).

Of course it is preferred to use more than one authentication method in each factor type. In order to be able to decide if the device of interest is in the possession of the target individual, one may use the Subscriber Identity which is stored in the form of an ID on the Subscriber Identity Module (SIM) on most phones. Most PDAs and other handheld devices also have similar network subscriber IDs.

This invention will not only utilize the third factor in conjunction with the first two factors in order to increase the security of the device and to reduce the chance of providing unauthorized access to individuals, but it also provides methodologies for combining these sources of information to reduce the chance of fraud.

As it will be made more clear, this new methodology may be used for many other similar authentication applications such as any financial transaction, any access control (to account information, etc.), and any physical access scenario such as doubling for a passport or an access key to a restricted area (office, vault, etc.). It may also be used to conduct remote transactions such as those conducted on the Internet (E-Commerce, account access, etc.). In the next section this multi-factor authentication is described further.

For the second factor (knowledge of a fact), as an example, a challenge in the form of a traditional passcode may be requested, in which case it is usually typed in, or depending on the available input devices, facial expressions (for cameras), natural language understanding or a repeated phrase, through a speech recognizer for a microphone input, a handwritten signature such as described by [Beigi, 2009] used with a touchpad or a pen may be used along with other methods, some of which are described in the section describing the authentication procedure, starting at Paragraph 40.

For the third factor (something one is), biometric techniques are used. Many different biometric methods may be used, such as those listed in the Biometric challenge section, starting on Paragraph 63. Some such techniques are Speaker Recognition, Image-Based or Audio-Based Ear Recognition, Face Recognition, Fingerprint Recognition, Palm Recognition, Hand-Geometry Recognition, Iris Recognition, Retinal Scan, Thermographic Image Recognition, Vein Recognition, Signature Verification, Keystroke Dynamics Recognition. Of course a multi-modal biometric recognition is preferred, since it reduces the chance of errors due to technological shortcomings and fraud.

Several methodologies will be presented by this invention in the process of combining the above elements from the three possible factors, in order to reduce the chance of fraud.

BRIEF DESCRIPTION OF THE DRAWINGS

FIG. 1 describes the registration process. This is the process that takes place once, either when the user has first activates the device or once for each new security level and access credential which is added.

FIG. 2 shows the components of a generic smart device such as a smartphone, PDA, etc.

FIG. 3 describes the process of hashing the subscriber ID (S) and the biometric models, $B_n; n \in \{1, 2, \ldots, N\}$, such that they are prepared for the registration with the CA or verified before usage.

FIG. 4 shows the process of encrypting and decrypting the hashed data.

FIG. 5 describes the process of digitally signing the reference data by the Certificate Authority.

FIG. 6 describes the validation process of the reference data on the phone at the time of the authentication.

FIG. 7 describes the serial validation process for multiple certificate authorities.

FIG. 8 describes the parallel validation process for multiple certificate authorities.

FIG. 9 describes the process of registration with a transaction authority such as a credit card company in order to be able use their transaction services.

FIG. 10 describes the generic transaction process through a Point of Service vendor in conjunction with the registered transaction authority relevant to this transaction. The POS may be a vendor who sells goods, provides services, or an access point.

FIG. 11 describes a point of sale transaction employing multi-factor authentication in conjunction with a purchaser's mobile device.

FIG. 12 describes a web-based electronic commerce transaction utilizing multi-factor authentication in conjunction with a purchaser's mobile device through the Internet.

FIG. 13 describes a process to realize an electronic passport into a place.

FIG. 14 describes a process in which the authentication techniques may be used to unlock a vault, providing access.

DETAILED DESCRIPTION OF THE INVENTION

The following is a system in which a person may use a Cellular (Mobile) Telephone, a PDA or any other handheld computer to make a purchase. This is an example only. The process may entail any type of transaction which requires authentication, such as any financial transaction, any access control (to account information, etc.), and any physical access scenario such as doubling for a passport or an access key to a restricted area (office, vault, etc.). It may also be used to conduct remote transactions such as those conducted on the Internet (E-Commerce, account access, etc.). In the process, a multi-factor authentication is used.

In this narrative, the words, "PDA", "device," and "phone" are used interchangeably to indicate a Cellular (Mobile) phone, any Personal Digital Assistant (PDA), Personal Music Player (Assistant), or any portable electronic device capable of capturing a biometric and communicating with a computer and/or telephony network.

As we will see later, one of the possible biometrics would be speech (speaker recognition). In this specific case, for example, the PDA of FIG. 2 would have to be able to capture audio and communicate with a network. Examples of such devices are cellular telephones with network access (WIFI, WAN, LAN, BlueTooth, etc.) and computational capabilities—e.g., iPhone, iPod, iPaq, any PDA with a microphone, etc.

FIG. 2 shows the generic infrastructure of a mobile device (PDA). The device generally consists of a central processing unit (CPU) 8 which performs most of the computation, a persistent memory 6 which is used to store data for future use, a random access memory (RAM) 10 which is used for short term storage while a computation takes place or to load and run an application and its dynamic data segments, a subscriber identity model (SIM) device 12 which is used by telephone service providers to store the unique identity of the user account, S, a communication hardware 14 which specializes in telephone, wireless, networking, and related operations, peripheral hardware 22 which includes all other hardware used for the operation of the phone such as illumination, touchpad, switches, volume control, speakers, etc. In addition, there are human interface sensors which are usually used for communication between the user and the phone and some of which may be used to capture biometric information from the user to be processed as an extra authentication factor. Some of these devices have dual purposes (communication and biometric), such as a microphone 16 which may be used for telephone conversations as well as capturing the speech of the individual for speaker recognition—see Paragraph 64. The camera 18 is another dual use sensor which may be used for taking pictures as well as obtaining images for doing image recognition as a biometric—see biometrics using imaging, starting with face recognition on Paragraph 69. Other biometric sensors such as a fingerprint sensor 20 may be added to devices for extra security.

For instance, if the biometric of choice is fingerprint, then the PDA would have to have a fingerprint capture device. These requirements have been explored in the description below, for different biometrics.

The Enrollment and/or Registration Stage

When the phone is registered (or at some later time), the owner of the device does a biometric enrollment and the model/models is/are built and stored on the device. These models are generally representations of the features of the specific biometric of interest. Most biometric models do not store the actual features of the biometric. The models are usually statistical parameters and other function representations of the features captured at the enrollment process combined with statistical or function of features of some larger training sample from the biometric vendor. [Beigi, 2012], herein incorporated by reference in its entirety, provides an overview of biometric models as well as a detail treatment of speaker recognition as a biometric.

The initial enrollment may need to be verified by a third party using a Public Key Infrastructure (PKI) such as the X.509 standard being used by most Internet applications and prescribed in detail in the ITU-T RFC 5280 [Cooper et al., 2008]. The noted third party may be a certificate authority, such as those which exist for issuing secure certificates, or may be another trusted institution, such as the service provider, a bank or a notary. The enrollment may be certified using a secure key such as the digital certificate which is signed by an SSL certificate authority. It makes sense for this to be done by the Cellular telephone vendor who makes the sale or by his/her organization. See the Encryption and Key exchange section.

Once the biometric enrollment is completed, the models for doing a biometric challenge are ready to enable the biometric authentication services on the phone.

At this point, account information may be linked to the device/user through registration with a transaction authority FIG. 9 The difference between this step and the actual transaction is that it allows for tailoring the multi-factor authentication for the particular device/user in order to dictate the strength of the authentication. This strength may be varied for different user-transaction combinations. Each security level may have a special digital certificate associated with it and at the time of usage, the transaction authority may request different levels of security (different credentials). For example, consider a MasterCard account and access as a country's passport. The financial institution issuing the MasterCard, will conduct an Authentication as listed in the Authentication Procedure step and then will issue a secure certificate in the form of a key to the phone which will be saved by the telephone and associated with that account. The passport office will do the same, generating a passport certificate. The credentials for obtaining these keys may be less or more stringent depending on the security level. The level of security is inherent in the certificate which is issued.

At this stage, the biometric enrollment and account linking is done. Let us assume that there is a MasterCard account certificate issued by bank A and saved on the device, the person's passport is linked with the phone and the employer of the individual has linked in an account for accessing the office building and special parts of the company which require restricted access.

Note that all the information is being stored in the form of encrypted keys in the phone and each key may only be deciphered by the issuing authority who has the related private key used at the time of conducting the transaction. This is in contrast with holding the information on a server or servers which would have to be distributed. A server-based solution is not viable since it requires constant communication with the place where the information is stored and may be fooled to release the information to unauthorized devices. In the situation described here, once the linking is done, the possession of the device holding the keys also becomes important.

For every account which is linked, a minimum requirement of the available authentication methods is picked. The authorizing institution sets the minimum requirements at the setup and the owner of the PDA may add extra authentication methods to apply more security. Each linked account may be set up to require a different combination of authentication methods. N.B., see authentication methods for more information.

The Transaction

The transaction may be any process requiring authentication such as a physical access control scenario such as a passport, an account access scenario using the Internet or a telephone network, etc. The following sales transaction is used to simplify the understanding of the process.

1. The PDA is set to accept transactions by the owner at the time of conducting the transaction. We will call this the "ready mode."
2. The point of sale terminal (Cashier machine) discovers all the PDAs in ready mode. This discovery process may be done in one or more of many different possible methods, such as BlueTooth and IrDA discovery standards as well as the many wireless standards.
3. Photo of the PDA owner (or his/her name or ID) appears on the cashier's screen.
4. The cashier picks the correct person's PDA from the list and the two machines (PDA and Cashier) are linked.
5. The linking may be done on any network including a BlueTooth, a WIFI, Near Field Communication device, or WAN.
6. The PDA owner receives notification for the transaction plus the challenge information.
7. The customer picks a payment method from his PDA's linked accounts.
8. The payment method triggers a combination of challenges based on requirements which have been set in the set up stage by the PDA owner and the authorizing entity (e.g. the bank administering the credit card, the company allowing access to its premises, the passport agency, etc.).
9. In the communication, the cashier checks for the certificate key which has been linked with the transaction much in the same way that TLS and SSL work and check for the validity of the certificate. The cashier checks for the validity of the certificate of the customer through a network with the authorizing agency (much in the same way as a credit card purchase is checked today). The certificate may be revoked at any time, at which instance, the transaction will fail.
10. Challenges happen on the PDA and the results reported to the cashier.

The Authentication Procedure

The authentication process may check for the validity of the subscriber ID with an authority. Note that the authenticity of the subscriber ID has been validated by the validation process (Paragraph 51) and should only be checked by some transaction authority for validity.

Based on the second authentication factor (something one knows), a challenge request may initiated by the point of service. This item may be designed to work seamlessly with a biometric challenge (see Speaker Recognition[Beigi, 2012] for example) or it may be entered using the keypad or any other data entry device, such as picking from a list of images, etc.

The authentication also includes one or more biometric challenges [Beigi, 2012]: This item has been described below in detail, beginning in Paragraph 63.

Registration with the Certificate Authorities

FIG. 3 shows the primary process in the encryption, validation, and registration of the authentication elements with the Certificate Authorities. In the figure, $Y_i = H_i(X_i) : i \in \{0, 1, \ldots, N\}$ denotes a hashing function [van Tilborg and Jajodia, 2011]. i=0 relates to the hashing function for the subscriber ID, S, and $i=n:n \in \{1, 2, \ldots, N\}$ relates to the hashing functions which are used to hash the biometric models (prototypes), $B_n : n \in \{1, 2, \ldots, N\}$. Technically, there it not necessary for these functions to be different, however, the most general case would call for different functions. Also, it is possible for the hashing function to just be the identity function given by Equation 1.

$$Y = I(X) \triangleq I(X) = H(X) : H(X) = X \qquad (1)$$

The output of the hash function is a string of binary digits called the hash of X, H(X).

The following definitions are used to describe the digital signature of the information which is stored on the device to ensure the authenticity of the authentication references.

$$X_i \triangleq \text{Authentication Reference } \forall i \in \{0, 1, \ldots, N\} \qquad (2)$$

where $X_0 = S$ and $X_n = B_n \; \forall n \in \{1, 2, \ldots, N\}$. The authentication reference is also referred to as reference data herein.

$Y_i$ denotes the output of the hash function applied on the authentication reference, $X_i$, $$Y_i \triangleq H_i(X_i) \; \forall i \in \{0, 1, \ldots, N\} \qquad (3)$$

Assuming that there is a certificate authority [Cooper et al., 2008], [van Tilborg and Jajodia, 2011] who is used to sign the references, we denote that authority by CA and the private and public keys of that authority, as defined by the X.509 standard [Cooper et al., 2008] for the Public Key Infrastructure (PKI) are denoted by the following two variables respectively, $$R_{CA} \triangleq \text{Private key of the CA} \qquad (4)$$

$$P_{CA} \triangleq \text{Public key of the CA} \qquad (5)$$

In the same way as in Paragraph 46, there will be a private and public key pair which are generated on the PDA at the time of the registration, using the registration application.

This pair of keys is denoted by the following two variables, $$R_{PDA} \triangleq \text{Private key of the Device} \quad (6)$$

$$P_{PDA} \triangleq \text{Public key of the Device} \quad (7)$$

We need to define two functions which denote the encryption and decryption of some data. These functions are defined as follows, using any encryption technique which may be desirable. Many such techniques are given by the X.509 standard [Cooper et al., 2008] and a lot more are explained in detail in [van Tilborg and Jajodia, 2011].

$$Z = E(R, Y) \triangleq \text{Encryption function for Private key } R \text{ and data } Y \quad (8)$$

$$D(P,Z):D(P,Z)=Y(\text{Decryption function}) \quad (9)$$

where $$Z_i \triangleq E(R, Y_i) \forall i \in \{0,1,\ldots,N\} \quad (10)$$

FIG. 4 shows the generic encryption and decryption of the hashed data.

FIG. 5 shows the signature process using the above definitions. It is important to note that the Certificate Authority (CA) never sees the raw subscriber ID, S, or the biometric models, $B_n$. The CA only receives an encrypted copy of the hashed data for each i, $Z_i$. It also receives the public encryption key of the registration application on the device, $P_{PDA}$, such that it can decrypt the data and see the hashed data, $Y_i$. In addition, the credentials of the registration application are sent along much in the same way as a digital certificate is requested from the CA described in X.509. The credentials are used by the CA to decide if it should sign the hashed data for the device or not. We do not go into any detail about that since it is a well established process and different CAs have different procedures for that. Then the CA uses its private key, $R_{CA}$, which is unknown to the PDA, to encrypt (sign) the hashed data, $Y_i$. This signed data, $A_i:i \in \{0, 1, \ldots, N\}$, is then sent back to the registration application on the PDA, along with the public key of the CA, $P_{CA}$. $P_{CA}$ is the certificate which is used by the PDA authentication applications in order to be able to decrypt the signed version of the hashed data, $A_i$, in order to get a certified copy of the hashed reference, $Y_i^{CA}$. Superscript CA means that this is the certified hash value of the reference data, $X_i$.

The signed hashed values, $A_i$, and the public key of the CA, $P_{CA}$, are stored in the persistent memory of the device shown in FIG. 2.

Validation of Reference Data

FIG. 6 shows the validation process for the reference data. At the time of each transaction where authentication is necessary, this process of validation takes place. The data is retrieved from the persistent memory of the device and is decrypted to get the signed hash values of the different reference data. Then the original reference data is retrieved by the authentication application from the persistent memory of the device and is hashed in the same manner as it was done in the hashing step of the registration defined in Paragraph 43. These two sets of hash values are then compare as prescribed by FIG. 6 to see if they match. If they match, the multi-factor authentication process will begin, described, beginning in Paragraph 40 and shown in FIG. 11, FIG. 12, FIG. 13, and FIG. 14 depending on the scenario at hand. In this authentication process, as described, the subscriber ID, multiple biometrics, and multiple types of challenges are used to do the final multi-factor authentication of the individual, the device, and transaction.

Multiple CA Signatures

For more security conscious applications, it is possible to have multiple CAs sign the hash values. This may be done either in parallel or in series. For a series process, the hash values are sent to CA1 Then the resulting signed data from CA1, $A_i^1$ is sent to CA2 to receive $A_i^2$, and so on. Finally, there will be an encrypted data with a series of M public keys associated with the M different CAs. In this case, the registration application will store the order of signatures, O, in an encrypted file, using $R_{PDA}$ and stored in the persistent memory of the PDA, along with $A_i^M$ from the last ($M^{th}$)CA, and all M public keys, $P_{CA}^m: m \in \{1, 2, \ldots, M\}$.

At the time of validating a data signed by a series of CAs, the authentication application will decrypt the order data, O, from the persistent memory using $P_{PDA}$ and uses it to decrypt the series of encryptions in the reverse order, using $A_i^M$ and $P_{CA}^M$ to get $A_i^{M-1}$ and so on until a $Y_i^{CA}$ is deciphered. See FIG. 7. The procedure of validation and authentication will then continue as prescribed in Paragraph 51.

For a parallel signature process, each CA signs the same $Y_i$ independently. In this case, all $A_i^m$, $P_{CA}^m: m \in \{1, 2, \ldots, M\}$ are stored. No specific order is necessary. At the validation step, all the hash values deciphered from the $A_i^m$ and from the reference data would have to match. See FIG. 8.

The multiple signature process may be used to store the different signed hash values at different locations. For example, if the device has access to network storage in L locations, it may send each of L signed hash values by L different CAs to these L locations, one of which is the persistent memory of the PDA. Then at the authentication step, it may try to retrieve as many copies of these hashed values as possible. If because of network or technical issues some of the L locations are not accessible, it can use down to a minimum prescribed number of different retrieved signed copies as it can. Then if the prescribed minimum locations is met and if all the hash values match with the data on the PDA, the device may go ahead with the authentication process.

It is important to ensure that the applications in charge of the registration and authentication are genuine and certified. This may be done using standard digital certificates which have been described in detail in [van Tilborg and Jajodia, 2011].

Registration with the Transaction Authorities

See FIG. 9. A transaction authority (TA) 76 is any authority which has control over the transaction of interest. For example, this may be a credit card company for charge transactions, a financial institution for performing a financial transaction, an office authority for providing access to a building, a government organization for providing passport access, an airport or any other transportation authority for allowing entrance credentials to a terminal, a bank for allowing access to a vault, etc.

In FIG. 9, a PDA and a person 70 would initially have to be registered with a transaction authority 76, in order to be able to conduct a transaction at a later time. The following communication and processes take place between the PDA and the TA in order to have the PDA registered. At the PDA end,
1. Validate Reference Data—See Paragraph 51.
2. Create $R_{PDA}^T$ and $P_{PDA}^T$, which are the private and public keys in the PKI encryption key pair described in Paragraph 46. These keys are generated by the PDA specifically for communication with this specific transaction authority, TA.

3. Store the keys and send the public key, $P_{PDA}{}^T$, to the TA so that it may use this key for decrypting messages from the PDA.

4. Receive and store a public key from the TA, $P_{TA}$, which has been specifically created by the TA for communication with this PDA. Also, receive and store an account identifier, $ACC_{TA}$, which will be used by the TA in the future to retrieve information related to this registration.

On the other side, the TA will perform the following:

1. Receive the public key generated by the PDA, $P_{PDA}{}^T$, for use by the TA, such that the TA may decrypt messages from this PDA.

2. Authenticate the use using a multi-factor authentication plus a challenge-response session to provide a three-factor authentication.

3. Create a pair of PKI keys, $R_{TA}$ (private key) and $P_{TA}$ (public key) for the purpose of sending private messages to the PDA.

4. Store $R_{TA}$ and $P_{TA}$.

5. Send $P_{TA}$ and a generated account ID, $ACC_{TA}$, to the PDA. $ACC_{TA}$ is a record locator which will allow the retrieval of the data stored on the storage device of the TA 78.

A Generic Transaction Involving a POS and a TA

See FIG. 10. A Point of Service 74 is any party which would provide a sale or a service. Some examples have been provided as a Point of Sale merchant, figures FIG. 11, an electronic commerce process, FIG. 12, an access control system such as the door to an office, FIG. 13, and another access transaction where the transaction is to access a vault, FIG. 14. In the generic scenario, the three parties, PDA, POS, and TA perform the following respectively.

The PDA will perform the following actions:

1. Validate the reference data by performing the actions described in Paragraph 51.

2. Perform the biometric challenge Paragraph 42 and the challenge response of the POS for further authentication and a liveness test.

3. Receive the transaction and sign it using $R_{PDA}{}^T$ which was stored on the PDA storage device 72 at the registration step.

4. Send Signed Transaction along with the $ACC_{TA}$ which was stored at the registration stage to the POS.

5. Receive encrypted receipt which is forwarded to the PDA by the POS from the TA.

6. Decrypt the receipt using $P_{TA}$ which was stored on the storage device f the PDA at the TA registration process.

The POS will perform the following actions:

1. Authenticate the PDA/user by the three factor authentication involving steps one and two of Paragraph 60.

2. Send transaction list to the PDA for signing.

3. Receive the signed transaction list and the $ACC_{TA}$ from the PDA.

4. Pass the signed transaction list and the $ACC_{TA}$ to the TA.

5. Receive confirmation for the transaction.

6. Pass encrypted receipt from the TA to the PDA.

The TA will perform the following actions:

1. Receive the $ACC_{TA}$ for the PDA, which has been passed along by the POS.

2. Use $ACC_{TA}$ to retrieve the PDA record from the storage device 78.

3. Decrypt the signed transaction list using $P_{PDA}$

4. Verify the account and perform transaction.

5. Send transaction confirmation to the POS.

6. Encrypt receipt for the PDA using $R_{TA}$.

7. Send encrypted receipt to POS so that it may be forwarded to the PDA.

Biometric Challenge

There are several biometric challenges which may be used, depending on the available sensors. Today, most devices are equipped with a microphone as well as a camera. Some newer models of devices such as the iPhone, also have cameras which face the user. Other inexpensive sensors such as fingerprint sensors may be added to devices and are present on some larger devices. The following are some of the biometrics which are deemed practical for such a challenge. However, the list is not limited to the one given below. In general, any biometric system capable of verifying the identity of an individual based on a biological measure may be used for this purpose.

1. Speaker Recognition

In a generic speaker verification application, the person being verified (known as the test speaker), identifies himself/herself, usually by non-speech methods (e.g., a username, an identification number, et cetera). The provided ID is used to retrieve the enrolled model for that person which has been stored according to the enrollment process, described earlier, in a database. This enrolled model is called the target speaker model or the reference model. The speech signal of the test speaker is compared against the target speaker model to verify the test speaker.

Of course, comparison against the target speaker's model is not enough. There is always a need for contrast when making a comparison. Therefore, one or more competing models should also be evaluated to come to a verification decision. The competing model may be a so-called (universal) background model or one or more cohort models. The final decision is made by assessing whether the speech sample given at the time of verification is closer to the target model or to the competing model(s). If it is closer to the target model, then the user is verified and otherwise rejected.

The speaker verification problem is known as a one-to-one comparison since it does not necessarily need to match against every single person in the database. Therefore, the complexity of the matching does not increase as the number of enrolled subjects increases. Of course in reality, there is more than one comparison for speaker verification, as stated—comparison against the target model and the competing model(s).

Liveness Challenge

It is important to make sure that the user of the device is not using a prerecorded message captured from the authorized user of the phone to spoof (see [Beigi, 2012]) the speaker recognition engine. To do this, a challenge may be used that would test the liveness of the individual using the phone. Basically, these are some methods for doing such a liveness test.

A phrase is prompted or a question is asked. The user responds to the question or repeats the phrase. The audio is used to do the verification.

In this case, the response to the challenge may be combined with the phrase so that the content of the phrase being said may be decoded using a speech recognizer and the content may be matched against the expected the challenge response.

Most other biometric verification is quite similar to the speaker verification methodology given above. Some special features of other biometrics are listed below.

2. Ear Recognition Image-Based

There are two types of image-based ear recognition systems, two-dimensional and three-dimensional. Two-dimensional image-based ear recognition relies on a photograph of the ear which may be taken using the built-in camera of the phone. The image may be taken and processed directly from the camera. The techniques use information about the color, texture, and shape of the ear to determine the identity of the claimant [Fabate et al., 2006, Nosrati et al., 2007, Zhang et al., 2005, Yuan et al., 2007]. There are also some 3-dimensional algorithms which either use a three-dimensional image of the ear (in which case they mostly need a supplemental 2-dimensional image for color reference). These techniques either use a three dimensional image [Chen and Bhanu, 2007, Cadavid and Abdel-Mottaleb, 2007] of the ear or combine several two-dimensional images to produce a 3-D image [Zhang and and, 2008, Liu and and, 2007]. The three-dimensional approach does not seem to be too practical for a PDA application.

3. Ear Recognition—Audio-Based

The second ear recognition approach uses the acoustic properties of the pinna to establish the identity of the individual. In this approach, a small speaker and a microphone, both point into the ear canal. The speaker sends out a wave (1.5-kHz-22-kHz) into the ear canal at an angle and once the wave goes through the canal and reflects back from the ear drum and the wall of the canal, the microphone picks up the reflection wave. The way the wave is manipulated by this reflection is a related to the transfer function which is made up of the transfer functions of the speaker, the pinna, the ear canal and the microphone. This transfer function is estimated based on the input and reflected output [Akkermans et al., 2005]. This technique may be deployed by using a special earphone to replace the normal earphone that usually accompanies the PDA.

4. Face Recognition

Automatic face recognition has received quite a bit of attention in the last decade mostly due to the availability of the many video cameras in public locations for security purposes. Although, there has been active research in third field for more than 3 decades [Brunelli and Poggio, 1993]. There have also been a handful of books written on the subject in the recent years [Li and Jain, 2005, Zhou et al., 2008]. Cooperative face recognition may be use by incorporating the built-in camera in the PDA to identify the user. In order to ensure liveness of the user, several different techniques may be deployed.

Liveness Challenge

One possible liveness challenge is to request one or more pictures from the user with different expressions. For example, the candidate may be asked to make a specific expression which he/she has made in the past and which is registered in the telephone upon enrollment. The challenge would be the random tag associated with some of the enrolled expressions. The user is the only person who would know how to make the specific expression by name. The biometric models (enrollment data) are kept on the PDA in an encrypted form. Therefore, there is no way anyone can see the corresponding expressions. Only The tag is stored on the PDA. The challenger will ask for a specific number which is interpreted by the face recognition software as the label for a specific expression. The tag is then displayed on the PDA and the candidate will point the PDA toward his/her face and changes his expression to the dictated expression and presses a button. The image is then verified using the PDA and the results are passed to the authentication requester (cash register, etc.)

5. Fingerprint

Finger print recognition [Maltoni et al., 2003] would require the existence of a fingerprint sensor.

6. Palm

On portable devices, hand-palm recognition [Saeed and Werdoni, 2005] may be done using the built-in camera.

7. Hand-Geometry

Normally, hand geometry [Sanchez-Reillo et al., 2000] recognition is used in larger systems, however, on a small portable device, the built-in camera may be used for capturing samples.

8. Iris

Iris recognition [Ma et al., 2003] is usually implemented using sophisticated cameras. However, in the applications of interest to this invention, it is presumed that the user will be a cooperative user (see [Beigi, 2012]). Therefore, the built-in camera should be sufficient for most applications.

9. Retina

Using a special modification to the the camera for conducting a retinal scan (see [Borgen et al., 2008]).

10. Thermography

Using a modification to the camera for obtaining thermal images [Selinger and Socolinsky, 2003]. These modifications are currently costly, but may come down in price and become more practical in the future.

11. Vein Recognition

Vein recognition [Beigi, 2012] generally requires infrared or near-infrared imaging. It may be done using a modification to the camera.

12. Handwriting

For telephones and PDAs which have a stylus, signature verification citer-m:gruber-2010, may be used. Those with touchpads may also use a simpler gesture recognition systems.

13. Keystroke

For PDAs and cellular telephones with a keyboard (soft or hard), a phrase will be requested which will be typed using the keyboard and the typing style and dynamics [Araujo et al., 2005, Azevedo et al., 2007, Bartlow and Cukic, 2006, Bleha et al., 1990, Hu et al., 2008] will be used to do the verification.

14. Multimodal

Any combination of the above biometrics may be used to reduce the error rate and obtain a more reliable result. This combination may be done in any of the methods described in general, by this invention, treating biometric verification as a form of encryption, as well as straight combination of the results.

There have been described and illustrated herein several embodiments of a method and system that performs electronic transactions with a mobile device using multi-factor authentication. While particular embodiments of the invention have been described, it is not intended that the invention be limited thereto, as it is intended that the invention be as broad in scope as the art will allow and that the specification be read likewise. Thus, while particular hashing functions and public key infrastructure systems have been disclosed, it will be appreciated that other hashing functions and key infrastructure systems can be used as well. In addition, while particular types of biometric models and biometric verification processes have been disclosed, it will be understood that other suitable biometric models and biometric verification processes can be used. Furthermore, while particular electronic transaction processing has been disclosed, it will be understood that other electronic transaction processing can be similarly used. It will therefore be appreciated by those skilled in the art that yet other modifications could be made to the provided invention without deviating from its spirit and scope as claimed.

REFERENCES

[Akkermans et al., 2005] Akkermans, A., Kevenaar, T., and Schobben, D. a. (2005) Acoustic ear recognition for person identification In *Automatic Identification Advanced Technologies, 2005. Fourth IEEE Workshop on pages* 219-223.

[Araujo et al., 2005] "User authentication through typing biometrics features" (Araujo, L. C. F. and Sucupira, L. H. R., Jr. and Lizarraga, M. G. and Ling, L. L. and Yabu-Uti, J. B. T. and).

[Azevedo et al., 2007] Azevedo, G., Cavalcanti, G., and Filho, E. a. (2007) An approach to feature selection for keystroke dynamics systems based on pso and feature weighting In *Evolutionary Computation, 2007. CEC 2007. IEEE Congress on pages* 3577-3584.

[Bartlow and Cukic, 2006] Bartlow, N. and Cukic, B. a. (2006) Evaluating the reliability of credential hardening through keystroke dynamics In *Software Reliability Engineering, 2006. ISSRE '06. 17th International Symposium on pages* 117-126.

[Beigi, 2009] U.S. Pat. No. 7,474,770 b2 (Homayoon Beigi).

[Beigi, 2012] Beigi, H. (2012) *Fundamentals of Speaker Recognition* Springer New York ISBN: 978-0-387-77591-3.

[Bleha et al., 1990] "Computer-access security systems using keystroke dynamics" (Bleha, S. and Slivinsky, C. and Hussien, B. and).

[Borgen et al., 2008] Borgen, H., Bours, P., and Wolthusen, S. (2008) Visible-spectrum biometric retina recognition In *International Conference on Intelligent Information Hiding and Multimedia Signal Processing* (IIHMSP2008) pages 1056-1062.

[Brunelli and Poggio, 1993] "Face recognition: Features versus templates" (R. Brunelli and T. Poggio).

[Cadavid and Abdel-Mottaleb, 2007] Cadavid, S. and Abdel-Mottaleb, M. a. (2007) Human identification based on 3d ear models In *Biometrics: Theory, Applications, and Systems, 2007. BTAS 2007. First IEEE International Conference on pages* 1-6.

[Chen and Bhanu, 2007] "Human ear recognition in 3d" (Hui Chen and Bhanu, B. and).

[Cooper et al., 2008] Cooper, D., Santesson, S., Farrell, S., Boeyen, S., Housley, R., and Polk, W. (2008) Internet X.509 Public Key Infrastructure Certificate and Certificate Revocation List (CRL) Profile RFC 5280 (Proposed Standard).

[Crotty, 2005] Crotty, A. (2005) Wizzit has done its homework, says mphahlele World Wide Web http://www.next-billion.net/archive/files/Wizzit%20Business%20Report.pdf.

[Fabate et al., 2006] Fabate, A., Nappi, M., Riccio, D., and Ricciardi, S. a. (2006) Ear recognition by means of a rotation invariant descriptor In *Pattern Recognition, 2006. ICPR 2006. 18th International Conference on volume* 4 pages 437-440.

[Hu et al., 2008] Hu, J., Gingrich, D., and Sentosa, A. a. (2008) A k-nearest neighbor approach for user authentication through biometric keystroke dynamics In *Communications, 2008. ICC '08. IEEE International Conference on pages* 1556-1560.

[ICT Regulation Toolkit, 2011] ICT Regulation Toolkit (2011) Practice note: Examples of financial services using mobile phones World Wide Web http://www.ictregulationtoolkit.org/en/PracticeNote.3096.html.

[Li and Jain, 2005] Li, S. Z. and Jain, A. K., editors (2005) *Handbook of Face Recognition* Springer New York ISBN: 978-0-387-40595-7.

[Liu and and, 2007] Liu, H. and and, J. Y. (2007) Multi-view ear shape feature extraction and reconstruction In *Signal-Image Technologies and Internet-Based System, 2007. SITIS '07. Third International IEEE Conference on pages* 652-658.

[Ma et al., 2003] "Personal identification based on iris texture analysis" (Li Ma and Tieniu Tan and Yunhong Wang and Dexin Zhang).

[Maltoni et al., 2003] Maltoni, D., Maio, D., Jain, A., and Prabhakar, S. (2003) *Handbook of Fingerprint Recognition* Springer New York ISBN: 978-0-387-95431-8.

[Nosrati et al., 2007] Nosrati, M. S., Faez, K., and Faradji, F. a. (2007) Using 2d wavelet and principal component analysis for personal identification based on 2d ear structure In *Intelligent and Advanced Systems, 2007. ICIAS 2007. International Conference on pages* 616-620.

[Saeed and Werdoni, 2005] Saeed, K. and Werdoni, M. (2005) A new approach for hand-palm recognition In *Enhanced Methods in Computer Security, Biometric and Artificial Intelligence Systems* Lecture Notes in Computer Science pages 185-194. Springer London ISBN: 1-4020-7776-9.

[Sanchez-Reillo et al., 2000] "Biometric identification through hand geometry measurements" (Sanchez-Reillo, R. and Sanchez-Avila, C. and Gonzalez-Marcos, A.).

[Selinger and Socolinsky, 2003] "Appearance-based facial recognition using visible and thermal imagery: A comparative study" (Andrea Selinger and Diego A. Socolinsky).

[van Tilborg and Jajodia, 2011] van Tilborg, H. C. A. and Jajodia, S. (2011) *Encyclopedia of Cryptography and Security* Springer USNew York2nd edition ISBN: 978-1-4419-5906-5.

[Vodafone Group Plc., 2007] Vodafone Group Plc. (2007) The transformational potential of m-transactions.

[Yuan et al., 2007] Yuan, L., Mu, Z.-C., and and, X.-N. X. (2007) Multimodal recognition based on face and ear In *Wavelet Analysis and Pattern Recognition, 2007. ICWAPR '07. International Conference on volume* 3 pages 1203-1207.

[Zhang et al., 2005] Zhang, H.-J., Mu, Z.-C., Qu, W., Liu, L.-M., and and, C.-Y. Z. (2005) A novel approach for ear recognition based on ica and rbf network In *Machine Learning and Cybernetics, 2005. Proceedings of* 2005 *International Conference on volume* 7 pages 4511-4515.

[Zhang and and, 2008] Zhang, Z. and and, H. L. (2008) Multi-view ear recognition based on b-spline pose manifold construction In *Intelligent Control and Automation, 2008. WCICA 2008. 7th World Congress on pages* 2416-2421.

[Zhou et al., 2008] Zhou, S. K., Chellappa, R., and Zhao, W. (2008) *Unconstrained Face Recognition volume* 5 *of International Series on Biometrics* Springer New York ISBN: 978-0-387-26407-3.

What is claimed is:

1. A method of conducting an electronic transaction for an authorized user using a mobile device, the method comprising:
   (a) storing an identifier for the authorized user in persistent memory of the mobile device;
   (b) storing a biometric model in an encrypted form in the persistent memory of the mobile device, the biometric model representing biometric features of an authorized user of the mobile device;

(c) generating a first public key and private key pair ($P_{PDA}$, $R_{PDA}$) for the mobile device for use in conjunction with registration with at least one certificate authority;

(d) utilizing a predetermined hash function to generate a plurality of hash values $Y_i$ based upon reference data stored on the mobile device, said reference data including said identifier stored in (a) and data of said biometric model of (b) in decrypted form;

(e) encrypting said plurality of hash values $Y_i$ with said private key $R_{PDA}$ for the mobile device to derive a plurality of encrypted hash values $Z_i$, and communicating said plurality of encrypted hash values $Z_i$ as well as said public key $P_{PDA}$ for the mobile device to the at least one certificate authority;

(f) at the at least one certificate authority, decrypting said plurality of encrypted hash values $Z_i$ utilizing said public key $P_{PDA}$ for the mobile device to reconstruct said plurality of hash values $Y_i$;

(g) at the at least one certificate authority, generating a respective second public key and private key pair ($P_{CA}$, $R_{CA}$) for the respective certificate authority for use in conjunction with registration with the authorized user and the mobile device;

(h) at the at least one certificate authority, encrypting said plurality of hash values $Y_i$ reconstructed in (f) with said respective private key $R_{CA}$ to derive a plurality of encrypted hash values $A_i$;

(i) persistently storing said plurality of encrypted hash values $A_i$ derived in (h) for access by the mobile device;

(j) persistently storing said respective public key $P_{CA}$ for the respective certificate authority as generated in (g) for access by the mobile device;

(k) performing a validation process on the mobile device that
  (1) decrypts said plurality of encrypted hash values $A_i$ persistently stored in (i) utilizing said respective public key $P_{CA}$ persistently stored in (j) to derive a plurality of hash values $Y_i^{CA}$,
  (2) utilizes said predetermined hash function of (d) to generate a plurality of hash values $Y_i$ based upon said reference data stored on the mobile device, and
  (3) compares said plurality of hash values $Y_i^{CA}$ derived in (k)(1) and said plurality of hash values $Y_i$ derived in (k)(2) to determine if said hash values match one another; and (l) selectively performing a sequence of operations for carrying out the electronic transaction based upon the determination of (k)(3), wherein said sequence of operations include biometric verification for the authorized user of the mobile device utilizing said biometric model stored in (b).

2. A method according to claim 1, wherein the biometric verification of the authorized user of the mobile device in said sequence of operations of (l) includes:

(1) capturing a biometric sample for a user of the mobile device;

(2) executing a recognition engine on the mobile device that
  (i) processes the biometric sample of the user captured in (l)(1) to extract biometric features of the user and stores first data representative thereof,
  (ii) decrypts the encrypted biometric model of (b) to reconstruct the biometric features of the authorized user and stores second data representative thereof, and;
  (iii) compares the first data and the second data to determine whether the user of the mobile device whose biometric sample was captured in (l)(1) is the authorized user of the mobile device.

3. A method according to claim 2, wherein:
the biometric model of the authorized user as stored in (b) is based on at least one image of an anatomical part of the authorized user, and the biometric sample of the user captured in (l)(1) is based on at least one image of the anatomical part of the user.

4. A method according to claim 2, wherein:
the biometric model of the authorized user as stored in (b) is based on a plurality of images of the face of the authorized user for a plurality of expressions, and the biometric sample of the user captured in (l)(1) is based on at least one image of the face of the user for one or more of the plurality of expressions as specified in a challenge communicated to the user.

5. A method according to claim 2, wherein:
the biometric model of the authorized user as stored in (b) is based on reflection of sound in the ear canal of the authorized user, and the biometric sample of the user captured in (l)(1) is based on reflection of sound in the ear canal of the user.

6. A method according to claim 2, wherein:
the biometric model of the authorized user as stored in (b) is based on recorded speech of the authorized user, and the biometric sample of the user captured in (l)(1) is based on recorded speech of the user.

7. A method according to claim 2, wherein:
the biometric model of the authorized user as stored in (b) is based on recorded handwriting of the authorized user, and the biometric sample of the user captured in (l)(1) is based on recorded handwriting of the user.

8. A method according to claim 2, wherein:
the biometric model of the authorized user as stored in (b) is based on recorded keystrokes of the authorized user, and the biometric sample of the user captured in (l)(1) is based on recorded keystrokes of the user.

9. A method according to claim 2, wherein:
the biometric model of the authorized user as stored in (b) is based on at least one scan of the veins of an anatomical part of the authorized user, and the biometric sample of the user captured in (l)(1) is based on at least one scan of the veins of an anatomical part of the user.

10. A method according to claim 2, wherein:
the biometric model of the authorized user as stored in (b) is based on at least one thermogram of an anatomical part of the authorized user, and the biometric sample of the user captured in (l)(1) is based on at least thermogram of an anatomical part of the user.

11. A method according to claim 1, wherein:
the biometric verification of the authorized user of the mobile device in said sequence of operations of (l) further includes a liveliness challenge communicated to a user of the mobile device.

12. A method according to claim 1, wherein:
the sequence of operations of (l) further include at least one challenge to the user of the mobile device, the at least one challenge based upon stored information and known to the authorized user.

13. A method according to claim 1, wherein:
said biometric model of the authorized user as stored in (b) is generated by capturing at least one biometric sample of the authorized user during an enrollment process that includes the operations of (c) through (i).

14. A method according to claim 1, wherein:
the operations of (f) through (h) are carried out over a plurality of certificate authorities.

15. A method according to claim 14, wherein:
the encryption of (h) is carried out in a serial order over the plurality of certificate authorities; and
the decryption of (k)(1) is carried out in a reverse serial order with respect to the serial order of the encryption of (h).

16. A method according to claim 14, wherein:
the encryption of (h) is carried out in a parallel manner over the plurality of certificate authorities; and
the decryption of (k)(1) is carried out in a parallel manner over the plurality of certificate authorities.

17. A method according to claim 1, wherein:
said plurality of encrypted hash values $A_i$ is persistently stored in a distributed manner over a plurality of network storage locations.

18. A method according to claim 17, wherein:
said plurality of network storage locations are maintained by a plurality of certificate authorities.

19. A method according to claim 1, further comprising:
performing a registration process with a transaction authority, the registration process involving generating a third public and private key pair $(P_{PDA}^T, R_{PDA}^T)$ for use in communication from the mobile device to the transaction authority as well as a fourth public and private key pair $(P_{TA}, R_{TA})$ for use in communication from the transaction authority to the mobile device, wherein said transaction authority persistently stores data that links the fourth public and private key pair $(P_{TA}, R_{TA})$ as well as the third public key $P_{PDA}^T$ to an account of the authorized user for carrying out electronic transactions specific to the authorized user.

20. A method according to claim 19, wherein:
said mobile device persistently stores data that links the third public and private key pair $(P_{PDA}^T, R_{PDA}^T)$ as well as the fourth public key $P_{PDA}^T$ to an account identifier for said account of the authorized user.

21. A method according to claim 20, wherein:
the account identifier is communicated from the transaction authority to said mobile device during the registration process with the transaction authority.

22. A method according to claim 19, wherein said sequence of operations of (l) further includes:
generating transaction data at the mobile device in response to communication between the mobile device and a point of service;
encrypting the transaction data at the mobile device using the private key $R_{PDA}^T$ to generate encrypted transaction data;
communicating the encrypted transaction data from the mobile device to the transaction authority via the point of service;
decrypting the encrypted transaction data at the transaction authority using the public key $P_{PDA}^T$ to recover the transaction data; and
performing a transaction using the recovered transaction data.

23. A method according to claim 22, further comprising:
generating receipt data at the transaction authority for the transaction;
encrypting the receipt data at the transaction authority using the private key $R_{TA}$;
communicating the encrypted receipt data from the transaction authority to the mobile device via the point of service;
decrypting the encrypted receipt data at the mobile device using the public key $P_{TA}$; and
storing the decrypted receipt data at the mobile device for access by the authorized user.

24. A method according to claim 22, wherein:
said point of service is part of said transaction authority.

25. A method according to claim 19, wherein:
the transaction authority maintains data that specifies particular operations of the verification process of (k) and/or of the sequence of operations of (l).

26. A method according to claim 19, wherein:
a point of service is in communication with the mobile device, and the point of service generates data that specifies particular operations of the verification process of (k) and/or of the sequence of operations of (l).

27. A method according to claim 1, wherein:
the electronic transaction is a commercial transaction for the payment of goods or services.

28. A method according to claim 1, wherein:
the electronic transaction is used to control access to a secure area.

29. A method according to claim 28, wherein:
the secured area is selected from the group consisting of a secured premises, a secured building, a secured vault, a secured safety deposit box, a safe, a lock box, and a gun vault.

30. A method according to claim 1, wherein:
the electronic transaction realizes an electronic passport.

* * * * *